July 5, 1949. F. C. BATTISTELLA 2,475,419
PROCESS FOR THE EXTRACTION OF THE USEFUL CONTENT
OF OLIVE PITS AND THE PRODUCTS THEREOF
Filed Jan. 27, 1948
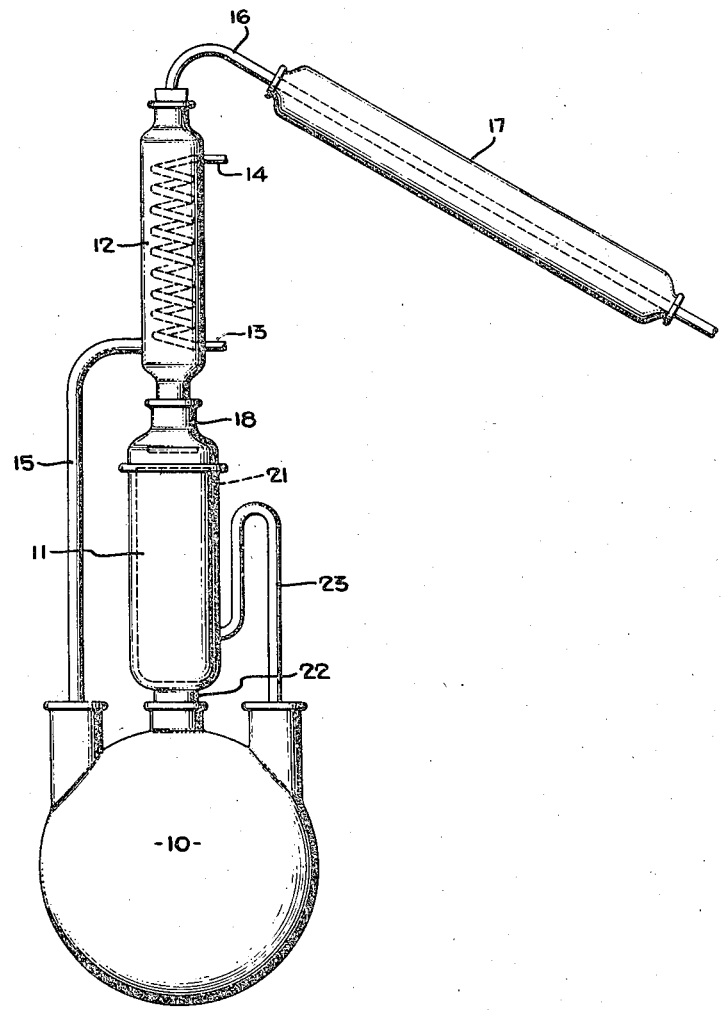
Frank C. Battistella
INVENTOR.
BY
ATTORNEY Patented July 5, 1949

2,475,419

UNITED STATES PATENT OFFICE 2,475,419

PROCESS FOR THE EXTRACTION OF THE USEFUL CONTENT OF OLIVE PITS AND THE PRODUCTS THEREOF

Frank C. Battistella, New York, N. Y., assignor to Richard E. Bishop, New York, N. Y.

Application January 27, 1948, Serial No. 4,668

7 Claims. (Cl. 99—118)

This invention relates to a new organic ingredient, essence or product which may be derived from olive pits and olive kernels, to novel food products containing such ingredient or essence, and to methods whereby the olive essence may be extracted from olive pits and kernels most effectively.

Olive oil is one of the most sought-after edible oils and its value lies in its blandness and distinctive flavor as well as in its ability to be readily assimilated. The best varieties of olive oil have been derived heretofore from the cellular meat or flesh of the olive and the so-called finest grades are produced by cold pressing the fruit in the absence of the kernels. The ordinary variety of olive oil is often produced by hot pressing the previously cold-pressed pulp, whereas prior attempts to employ solvents such as carbon bisulfide, for the purpose of extracting the residual oil from the pulp, have produced a very low grade oil high in free acid content, which was only of value as a soap stock.

Because of the delicacy of the characteristic components of olive oil, it was not possible heretofore to dilute them with other oils. Moreover, prior methods of expression have produced relatively small yields. Although it has been known that the kernels or pits of olives have an appreciable oil content, prior methods of extraction have been so inefficient and the quality of the oil derived therefrom has been so low that such oil has not been used heretofore for edible purposes.

The present invention is directed to the manufacture of what is hereinafter called "olive essence" derived from the pits and kernels of olives. This distinctive product may also be termed a terpeneless oil containing appreciable quantities of vitamins and plant hormones containing those constituents or components from which the characteristic olive oil odor and flavor are derived in very high concentration so that the essence may be diluted and still produce a resulting oil which is substantially indistinguishable from olive oil. The terpeneless olive essence derived in accordance with the present invention may be added in very small quantities to other oils or even to perfectly bland, tasteless, highly refined mineral oil and impart thereto the color, flavor and aroma of olive oil.

The invention, therefore, is also directed to a non-fattening food product consisting essentially of highly refined, neutral petroleum oil containing the olive essence in small proportion whereby the product may be used as a salad oil or as a component of mayonnaise and other food products, without the use of the normal non-drying, relatively fattening oils such as olive oil, cottonseed oil, etc.

This invention is also directed toward a method of treating olive pits and kernels under regulated conditions and with selective solvents whereby a very complete extraction is attained without the development of undesirable degradation products which impair the quality of the oil, without any deleterious effects, and concurrently permit the recovery of high yield. The method of the present invention contemplates the use of a mixture of solvents (preferably substitution products of methane), these solvents being blended so as to produce a mixture having an average boiling point held within predetermined narrow limits. By conducting the extraction at substantially the boiling point of the mixture of solvents, complete control is attained and high yields are obtained without impairment of quality.

It is an object of the present invention, therefore, to disclose and provide means, methods and conditions whereby olive pits and kernels may be treated for the recovery of an olive essence substantially free from terpenes and containing the characteristic flavor and odor-imparting components of virgin olive oil in high concentration.

A further object of the invention is to disclose and provide as a new article of manufacture an olive essence which is stable, does not become rancid when subjected to the same conditions as normal olive oil, and which can be used as a flavoring ingredient by reason of the high content of those components which impart the characteristic odor and flavor to virgin olive oil.

A further object of the invention is to disclose and provide a method of extraction whereby olive essence may be obtained in relatively large quantities from the pits and kernels of fresh olives, without the concurrent formation and extraction of undesirable components.

These and other objects and advantages of the present invention will become apparent to those skilled in the art from the following description. In order to facilitate understanding, reference will be had to the appended diagrammatic representation of an extraction unit, it being understood that such diagrammatic representation is simply illustrative and that various forms of equipment arranged to perform the operations hereinafter described in detail, may be employed in the commercial utilization of the invention.

The raw material utilized in the process of this invention consists of the pits of fresh olives. Such pits may have considerable quantities of the cellular meat adhering thereto. The pits may be whole or they may be crushed, broken, or even ground. Preferably, the pits are crushed so as to permit a more ready and rapid extraction of the entire pit wall and of the kernel originally enclosed thereby. It has been found that although fresh pits are preferred, the accumulation and storage of the pits for an appreciable period of time before the extraction does not appear to materially affect either the yield or the quality of the essence which may be derived therefrom.

It has been found that although various chlorinated hydrocarbons may be used for extraction, substitution products of methane, and particularly the various chlorides of methane, give rise to best results. Methyl chloride, dichloromethane, trichlormethane (chloroform) and carbon tetrachloride are illustrative of components of the preferred mixture of solvents. The boiling points of these solvents vary appreciably, methylene chloride having a usual boiling point of 40.1° C. whereas tetrachloromethane (carbon tetrachloride) has a boiling point of 76°–77° C. In carrying out the process of this invention, these various chlorides of methane are blended and proportioned so as to produce a mixture having a boiling point of about 38°–39° C. An illustrative mixture contained these solvents in the following proportions:

| | Per cent |
|---|---|
| Methyl chloride | 2 |
| Methylene chloride | 90 |
| Chloroform | 2 |
| Carbon tetrachloride | 6 |

In most instances it has also been found highly desirable to include a small proportion of isopropyl alcohol, the final mixture containing from about 1% to 3% of this solvent. The presence of isopropyl alcohol definitely increases the yield of olive essence, such increase in yield often amounting to more than 10%.

The extraction of the crushed or ground pits is carried out substantially at the boiling point of the solvent mixture, that is, at between about 38° C. and 39° C. One form of apparatus in which such extraction may be carried out is shown on the appended diagram. The diagram refers to laboratory units but substantially the same correlation exists in commercial equipment. As shown in the diagram, the still 10 containing a body of solvent mixture and provided with means for supplying controllable heat thereto is connected with an extraction chamber 11 and a reflux condenser 12. Inlet and outlet means for the cooling kiln in the condenser 12 are indicated at 13 and 14. The upper part of the still 10 is connected to the reflux condenser 12 by means of a vapor line 15. Uncondensed vapors from the reflux condenser 12 may pass by line 16 into any suitable type of final condenser 17.

The extraction chamber 11 is connected by means of a removable neck 18 with the bottom of the reflux condenser 12 and a suitable distribution head or spray head may be embodied in the neck 18. Removably positioned within the extraction chamber 11 is a permeable, porous or reticulated container, indicated at 21, containing the charge of crushed pits and kernels which are to be extracted. The lower portion of the extraction chamber may be provided with a valved outlet as at 22, leading back to the still.

As the mixture of solvents in the still is vaporized, such vapors pass by line 15 into condenser 12 and then move downwardly through the connector 18 onto the charge of crushed pits. After the charge of ground material has been fully covered, the valve at point 22 may be opened so as to permit the mixture of solvents and extracted material to return to the still. In lieu of such manually-operated valve, the siphon tube 23 may connect the lower portion of extraction chamber 11 with the still, such tube permitting solvent to accumulate within the extraction chamber and then be automatically siphoned out. The extraction chamber 11 may be jacketed, if desired, for the purpose of maintaining it but slightly below the boiling point of the mixture of solvents employed.

By controllably regulating the amount of heat supplied to the still 10, the operations above referred to may be carried out with solvent substantially at its boiling point. It will be recognized that the boiling point of the solvent is used as a means of establishing a predetermined maximum temperature during extraction. In actual practice the extraction is carried out at a temperature of not above 39° C. and not below 34° C., the lower limit depending somewhat upon the size of the extraction chamber, the amount of insulation thereon, whether some fuel heat is supplied to the jacket, etc. At the conclusion of the extraction, the mixture of solvents is separated from the extracted olive essence by distillation either in the same or auxiliary equipment.

It is to be noted that extraction at virtually the boiling point of the mixture of chlorinated organic solvents and at not appreciably above 39° C. (nor much below 34° C.) is important since the quality of the resulting liquid essence is impaired if temperatures in excess of 39° C. are used. The addition of the small amount of isopropyl alcohol to the mixture of solvents does not appear to impair the quality of the olive essence but it does very materially increase the yield. The reason for this increase is not definitely known but it is believed that the alcohol acts as a catalyzer or in a synergistic capacity. Moreover, it may be noted that the use of this mixture of chlorides of methane as the organic solvent exerts a very peculiar effect upon the pits and the cells of the pit walls and kernels. It is believed that a small amount of hydrogen chloride is released which breaks down the polysaccharides contained in the pits and kernels, reducing the polysaccharides to monosaccharides and disrupting the cells so as to permit extraction to be carried out with greatest effectiveness.

In the manner above stated a product is obtained described herein as the olive essence. The product is a dark green or greenish yellow, oily liquid and has a very pronounced persistent olive odor and flavor. It is soluble in most oils and in mineral oils. The iodine value of the olive essence ranges from about 80 to 84 and has a specific gravity of about 0.92, a saponification value of about 190, and a free fatty acid content of between 8% and 13%. As originally obtained the olive essence may be somewhat turbid and contain from 0.5% to perhaps 1.8% of solids which may be readily removed by filtration. This olive essence oil, however, contains carotene, thiamine, riboflavin, niacin, and other vitamins as well as some sterols. It is non-toxic and is entirely inactive as far as bacteriostatic and bactericidal properties are concerned.

One of the most distinctive characteristics of the olive essence is its pronounced resistance to rancidity and the remarkable concentration of those components which produce the characteristic olive oil flavor. The addition of ½ cc. of this olive essence to 100 cc. of bland, neutral, transparent, colorless, highly refined mineral oil imparts a light yellowish green coloration to the oil and a distinctive olive oil flavor. The amount of olive essence which thus can be added to highly refined mineral oil may vary from 0.5% to 5%, depending upon the precise characteristic which it is desired to impart to the finished product, but in all instances the resulting product is eminently adapted for use as a non-fattening salad oil or as an ingredient in mayonnaise, salad dressings, etc. It is to be remembered that many persons can not use the usual salad oils or dressings for dietary reasons, whereas the product herein disclosed is palatable and free from the disadvantages of natural vegetable and nut oils.

Detailed tests conducted on the olive essence in comparison with fresh olive oil and olive pit kernel oil made by prior methods conclusively show that the product of this invention is characteristically different and readily identifiable.

I claim:

1. An edible, non-toxic, liquid oil of the non-drying type derived from the pits and kernels of olives, said oil being dark yellow-green in color having an iodine value of between about 80 and 84, containing niacin, carotene, thiamin and riboflavin and containing a distinctively greater content of esters and components imparting a characteristic olive flavor to the oil than the content of such esters and components in normal olive oil derived from the flesh of olives.

2. An edible, non-toxic, liquid oil of the character stated in claim 1 characterized by the virtual absence of terpenes and the ability to be stored without the development of rancidity.

3. In a method of producing an olive essence the step of extracting olive pits with a mixture of chlorine substitution products of methane, said mixture being proportioned to impart thereto a boiling point of about 38°–39° C.

4. In a method of producing a liquid olive essence, the step of extracting crushed olive pits with a liquid solvent comprising a mixture of chlorides of methane, said solvent mixture having a boiling point of 38°–39° C.

5. In the extraction of crushed olive pits for the production of a liquid olive essence, the step of extracting crushed olive pits with a solvent comprising a mixture of chlorides of methane and containing not more than about 4% of isopropyl alcohol, said mixture having a boiling point of 38°–39° C.

6. In the process of claim 5, the step of carrying out the extraction in the liquid phase and at a temperature of between 35° C. and the boiling point of the mixture of solvents.

7. In a method of extracting olive pits with an organic solvent, the step of controlling the maximum extraction temperature by blending the solvents used in such extraction to establish a mean boiling point substantially identical to the maximum extraction temperature.

FRANK C. BATTISTELLA.

REFERENCES CITED

The following references are of record in the file of this patent:

UNITED STATES PATENTS

| Number | Name | Date |
|---|---|---|
| 2,221,404 | Musher | Nov. 12, 1940 |